(12) United States Patent
Skubic et al.

(10) Patent No.: US 9,326,051 B2
(45) Date of Patent: Apr. 26, 2016

(54) METHOD FOR SOFT BANDWIDTH LIMITING IN DYNAMIC BANDWIDTH ALLOCATION

(75) Inventors: Björn Skubic, Hässelby (SE); Elmar Trojer, Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 865 days.

(21) Appl. No.: 13/391,555

(22) PCT Filed: Aug. 20, 2010

(86) PCT No.: PCT/EP2010/062196
§ 371 (c)(1),
(2), (4) Date: Feb. 21, 2012

(87) PCT Pub. No.: WO2011/020918
PCT Pub. Date: Feb. 24, 2011

(65) Prior Publication Data
US 2012/0148247 A1 Jun. 14, 2012

Related U.S. Application Data

(60) Provisional application No. 61/235,828, filed on Aug. 21, 2009.

(51) Int. Cl.
*H04Q 11/00* (2006.01)
*H04L 12/819* (2013.01)
*H04L 12/801* (2013.01)

(52) U.S. Cl.
CPC ............ *H04Q 11/0067* (2013.01); *H04L 47/10* (2013.01); *H04L 47/215* (2013.01); *H04Q 2011/0064* (2013.01); *H04Q 2011/0084* (2013.01)

(58) Field of Classification Search
None
See application file for complete search history.

(56) References Cited

U.S. PATENT DOCUMENTS

| 7,436,844 B2 * | 10/2008 | Wang et al. ............... 370/412 |
| 7,539,211 B2 * | 5/2009 | Oh et al. ................... 370/468 |
| 2010/0008379 A1 * | 1/2010 | Yoo et al. ................. 370/468 |
| 2010/0183304 A1 * | 7/2010 | Spector ..................... 398/66 |
| 2010/0221006 A1 * | 9/2010 | Yoon et al. ................ 398/58 |

FOREIGN PATENT DOCUMENTS

| CN | 101005453 A | 7/2007 |
| CN | 101399758 A | 4/2009 |
| EP | 1 833 207 A2 | 9/2007 |

OTHER PUBLICATIONS

Hellberg C et al: "Broadband network architectures: designing and deploying triple-play services, chapter 8", May 1, 2007, Broadband Network Architectures: Designing and Deploying Triple Play Services; [The Radia Perlman Series in Computer Networking and Security], Prentice Hall, Upper Saddle River, NJ, US. pp. 289-361.

* cited by examiner

*Primary Examiner* — Hassan Phillips
*Assistant Examiner* — Saba-Tsegaye

(57) ABSTRACT

A method of dynamic bandwidth allocation comprising updating a limit value ($B_{max,i,j}$) of bandwidth, comprising subtracting from an initial value ($N_{ij}$) a value ($M_{ij}^k$) indicative of previously assigned bandwidth, and adding a predetermined bandwidth value ($T_{ij}$).

8 Claims, 2 Drawing Sheets

METHOD FOR SOFT BANDWIDTH LIMITING IN DYNAMIC BANDWIDTH ALLOCATION

This application claims the benefit of U.S. Provisional Application No. 61/235,828, filed Aug. 21, 2009, the disclosure of which is fully incorporated herein by reference.

TECHNICAL FIELD

The present invention relates generally to dynamic bandwidth allocation for a communications network.

BACKGROUND

A Passive Optical Network (PON) comprises an Optical Line Termination (OLT), which resides in a Central Office (CO) and further comprises user modems, called Optical Network Terminals (ONT) or network units, called Optical Network Units (ONU). The OLT services a number of ONT's or ONT's, typically connected in a tree arrangement via an Optical Distribution Network (ODN) using an optical power splitter, which resides close to the user premises. Since the physical medium, of one or more communication links, is shared, the ONT's are scheduled by the OLT to transmit in the upstream direction in a Time Division Multiple Access (TDMA) manner.

In order to achieve high upstream bandwidth utilization the upstream scheduling must provide dynamic bandwidth allocation (DBA), which allows for bandwidth resource between lightly loaded and heavily loaded ONT's to be shared.

The Gigabit Passive Optical Networking (GPON) standard ITU-T G.984.x, introduces the concept of a Transmission Container (T-CONT). A T-CONT may be viewed as an upstream queue for a particular type of traffic (for example, video, voice and data). Each ONU typically holds several T-CONT's. The bandwidth assignment in the scheduling is done purely on a per T-CONT basis. Each T-CONT in the PON system is identified by a so-called Alloc ID. The OLT grants bandwidth to ONT's via a bandwidth map (BWmap) which comprises control signals sent in a downstream direction.

A Service Layer Agreement (SLA) associates each Alloc ID with respective bandwidth requirements to allow each Alloc-ID to be suitably serviced with bandwidth. The bandwidth requirements for one Alloc ID are described in terms of multiple bandwidth allocation classes. Each class has an associated bandwidth value, and together the values provide an overall bandwidth value for servicing each Alloc-ID. These limits define how a queue should be serviced with bandwidth. For example fixed bandwidth, assured bandwidth, non-assured bandwidth and best-effort bandwidth classes could be included in the SLA. Hence, a particular Alloc ID can be configured to obtain a certain amount of fixed bandwidth, up to a certain amount of assured bandwidth, up to a certain amount of non-assured bandwidth and up to a certain amount of best-effort bandwidth.

In order to be able to assign bandwidth to the T-CONT's according to need, the OLT may either utilize traffic monitoring or a messaging mechanism that has been introduced in the GPON protocol where status reports (containing queue occupancy) are transmitted to the OLT upon request. The OLT must, in addition to assigning bandwidth according to need, also enforce bandwidth guarantees, bandwidth capping and prioritization policies regarding traffic from different T-CONT's. The OLT is required to continually re-calculate how bandwidth is shared since the extent of queued traffic in each T-CONT varies over time.

We have realised that overly blunt, or rigid, DBA parameters result in certain services being given stricter service requirements than are actually required. This can result in sub-optimal bandwidth utilisation. We seek to provide an improved method of bandwidth allocation.

SUMMARY

According to one aspect of the invention there is provided a method of dynamic bandwidth allocation comprising updating a limit value of bandwidth of a bandwidth allocation traffic class, the method comprising subtracting from an initial value a value indicative of previously assigned bandwidth, and adding a predetermined bandwidth limit value.

The invention may be viewed as determining a limit value of a bandwidth allocation traffic class using predetermined limit value and a value of bandwidth previously granted.

Bandwidth allocation may advantageously be determined using a token bucket model. Advantageously, using a token bucket model provides the dynamic bandwidth allocation process with 'soft', or flexible, dynamic limits based on specified effective bandwidth limits and previously granted bandwidth, which results in improved bandwidth utilisation. Further advantageously, use of the token bucket model reduces jitter and average delay.

Other aspects of the invention relate to bandwidth allocation apparatus, a communications network node and machine-readable instructions (for execution by a processor of bandwidth allocation apparatus of a communications network node).

According to a second aspect of the invention there is provided a communications network node comprising a processor, the processor arranged to determine bandwidth allocation for at least two other communications network nodes, wherein the processor arranged to update a limit value of bandwidth by subtracting from an initial value a value indicative of previously assigned bandwidth, and adding a predetermined bandwidth value.

According to a third aspect of the invention there is provided bandwidth allocation apparatus for a communications network node comprising a processor, the processor arranged to determine bandwidth allocation for at least two other communications network nodes, wherein the processor arranged to update a limit value of bandwidth by subtracting from an initial value a value indicative of previously assigned bandwidth, and adding a predetermined bandwidth value.

According to a fourth aspect of the invention there are provided machine-readable instructions for execution by a processor of bandwidth allocation apparatus, the instructions arranged to cause the processor to update a limit value of bandwidth by subtracting from an initial value a value indicative of previously assigned bandwidth, and adding a predetermined bandwidth value

BRIEF DESCRIPTION OF THE DRAWINGS

One embodiment of the invention will now be described, by way of example only, with reference to the following drawings in which.

DETAILED DESCRIPTION

Figure 1:
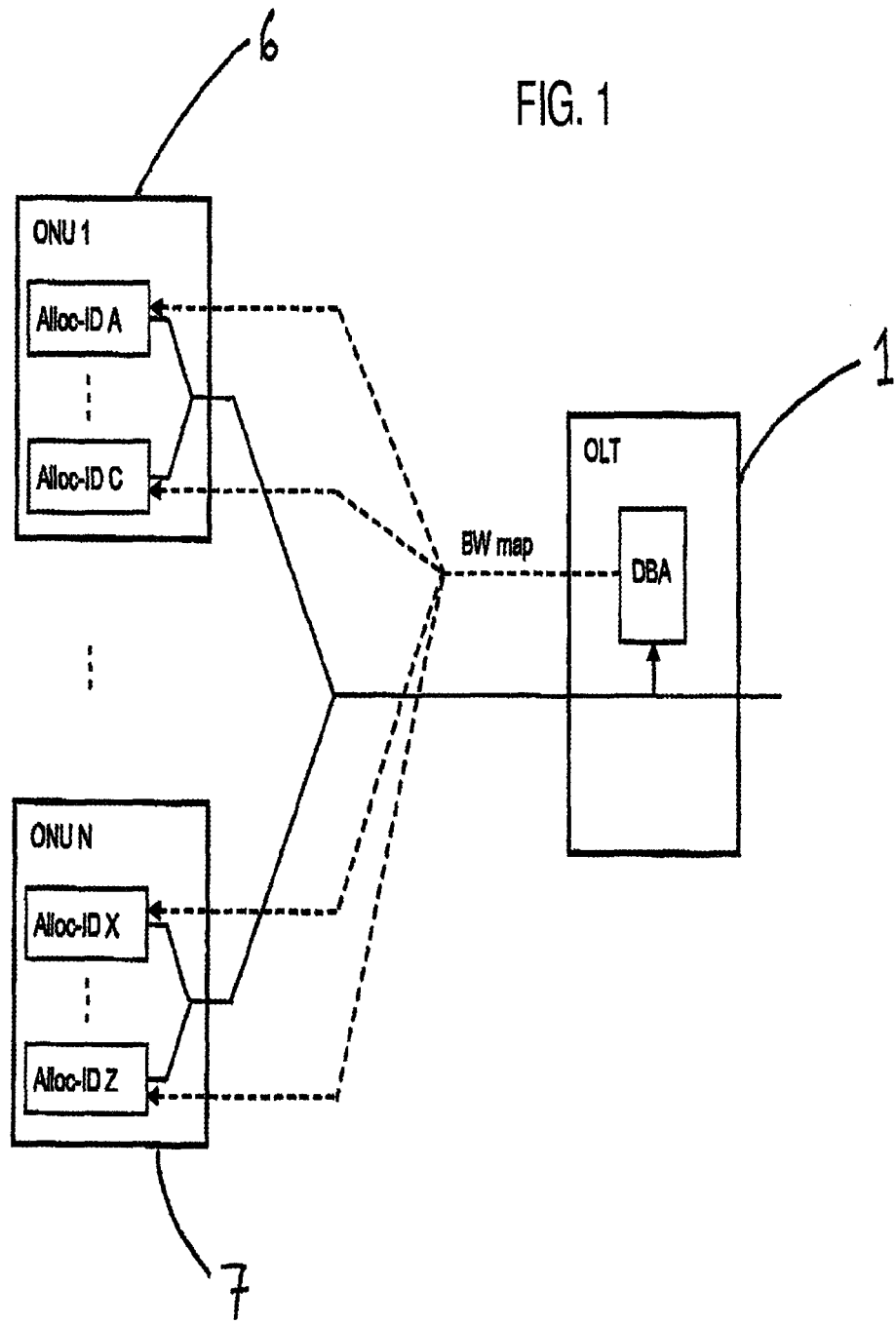
FIG. 1 shows a communications network.

FIG. 1 shows a communications network node comprising an Optical Line Termination (OLT) 1 connected to two further network nodes, namely Optical Network Units (ONU) 6 and 7. The OLT 1 is arranged to implement Dynamic Bandwidth Allocation (DBA) for the ONU's 6 and 7. The OLT comprises a processor configured to determine a bandwidth map which is output to the ONU's to control use of the available bandwidth.

The three principle DBA tasks are: (i) bandwidth demand prediction, (ii) bandwidth sharing and (iii) grant scheduling. Bandwidth demand prediction typically involves monitoring the amount of queued traffic at each ONU. Bandwidth sharing involves calculating how the available bandwidth is divided over the various queues of traffic at each ONU. Each queue at an ONU is called a T-CONT, identified by a respective Alloc-ID, and typically relates to a particular type of traffic (for example, video, voice and data). Each ONU typically holds several T-CONT's. The bandwidth assignment in the scheduling algorithm is done purely on a per T-CONT basis. Each T-CONT is specified by a T-CONT descriptor which contains criteria relating to maximum permissible bandwidth to be assigned to the T-CONT as well as specifying how the granted bandwidth is to be shared over the different classes for each T-CONT, such as fixed bandwidth, assured bandwidth, non-assured bandwidth, best-effort bandwidth. In other words, the T-CONT descriptor contains parameters that describe the bandwidth allocation service of a T-CONT and the descriptor may contain limits for maximum permissible bandwidth as well as maximum bandwidth for various bandwidth allocation classes. Within the Gigabit Passive Optical Networking (GPON) standard upstream transmission is based on the standard 125 µs periodicity. The DBA process produces an upstream bandwidth map comprising a control signal, or sequence of control signals, sent to the ONU's which divides the bandwidth of a 125 µs upstream super frame between the ONU's. The DBA process is executed with regular intervals at the OLT 1 producing an updated bandwidth map or sequence of bandwidth maps that can be used once or iteratively until it is updated.

Figure 2:
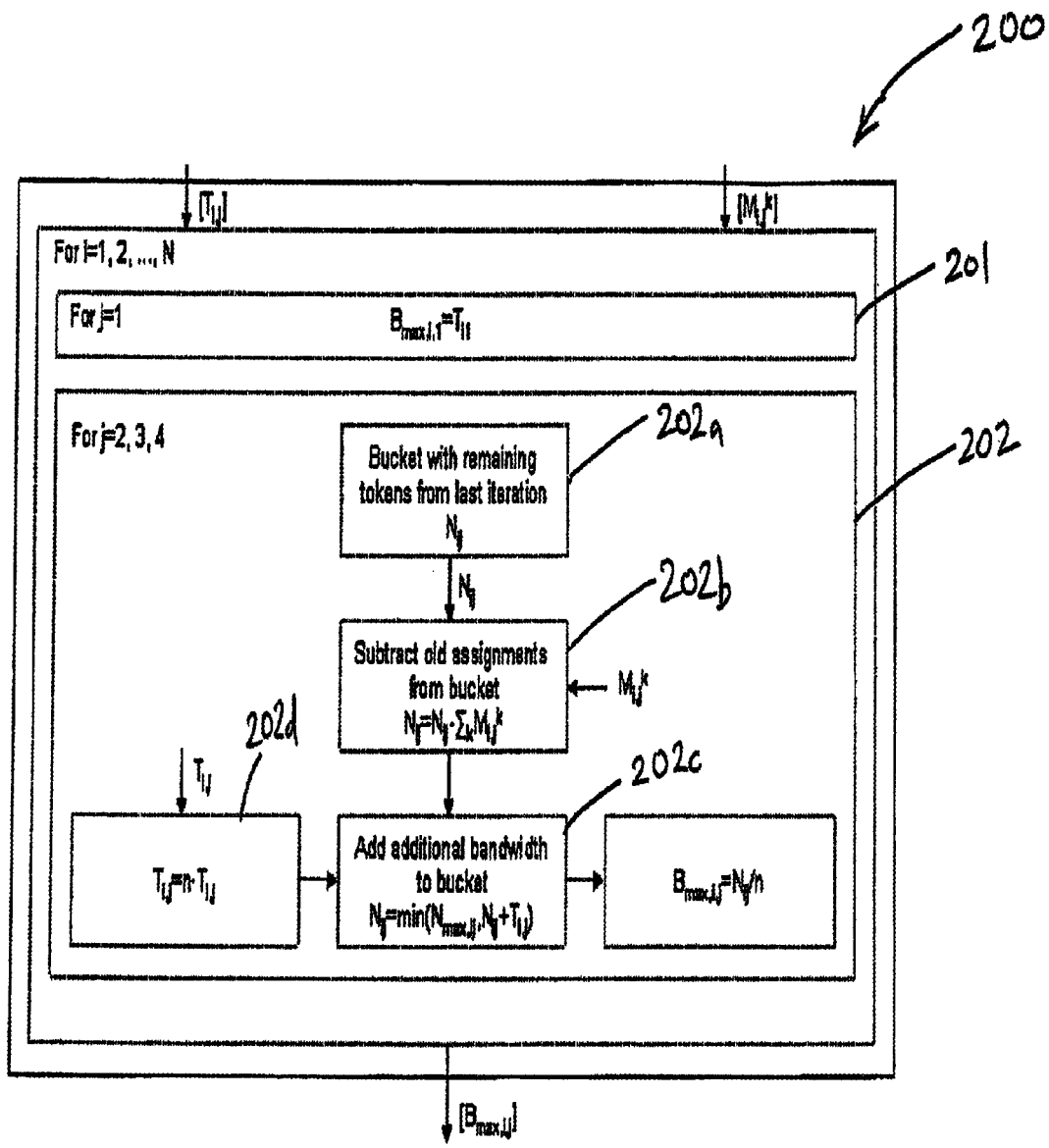
FIG. 2 shows a flow diagram.

There is now described a process of calculating bandwidth limits for each bandwidth allocation class. As described above, as an input at each DBA cycle the DBA process requires settings for maximum bandwidth rate per Alloc ID (i) and class (j). J=1, 2, 3, 4 are used to specify the classes fixed, assured, non-assured and best-effort, respectively. Effective values, $T_{ij}$, of these settings, or limit values, are predetermined and defined in the T-CONT descriptors. However, instead of using the effective values directly as hard limits in the DBA process for the assured, non-assured and best-effort classes, the embodiment described below with reference to the flow diagram 200 in FIG. 2, is a method of providing the DBA process with 'soft', or flexible, dynamic limits for those classes based on specified effective bandwidth limits and previously granted bandwidth.

The method is based on the so-called 'token bucket' analogy. In the token bucket model, tokens are placed into the bucket or logical container at a constant rate. If the bucket is full, excess tokens are discarded. Tokens are used to grant way for packets. Each arriving packet requires a token to pass. Tokens leave the bucket (ie are decremented) as packets are granted right to pass. The token bucket method enables control over average packet rate through the token rate, while allowing for a certain amount of burstiness determined by the bucket size, $N_{maxij}$. It will be appreciated that in the analogy, the number of tokens in the bucket at any one time represent available bandwidth and that reported bandwidth demand for a T-CONT play the role of arriving packets.

For the fixed bandwidth class of each Alloc ID, the maximum limit is set to the predetermined T-CONT descriptor value, $T_{i1}$, as shown at step 201.

Each bandwidth limit $B_{max,i,j}$ (for each Alloc ID and each of the traffic classes other than fixed bandwidth class) requires a token bucket. In the current embodiment one-byte tokens are used. At a given DBA cycle the number of tokens in the bucket, $N_{ij}$, sets to the maximum bandwidth limit for the specified Alloc ID and class. The number of tokens in each bucket (bandwidth limit) is changed when a token update process is executed shown by step 202. The token update process may be executed every n DBA cycles. The bandwidth limit is then given by the number of tokens in a bucket divided by n ($N_{ij}/n$).

The token update process both removes and adds tokens to the buckets. At step 202b, the sum of tokens corresponding to all bandwidth that was granted to an Alloc ID, $\Sigma_k M_{ij}^k$, during the past n DBA cycles, are removed from the buckets (at step 202a) for all the different classes corresponding to this Alloc ID. The index k is used to denote the DBA cycle. At step 202c, each bucket is then filled with the number of tokens corresponding to the nominal bandwidth limit (as defined in the T-CONT descriptor) for each class for the n coming DBA cycles. If the nominal bandwidth limit is specified in terms of bytes per GTC frame, $T_{ij}$, the bucket is filled with tokens corresponding to $n \cdot T_{ij}$ bytes, as shown at step 202d. The size of each bucket, $N_{max,ij}$, specifies the softness of the limit. The larger the bucket is, the softer the limit is. For a hard limit, the bucket size is set to the smallest possible size, ie identical to the nominal bandwidth limit multiplied by n.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of dynamic uplink bandwidth allocation at an Optical Line Termination (OLT) for dividing upstream bandwidth between Optical Network Units (ONUs) comprising:
   updating, by the OLT, a bandwidth limit value (Bmax,i,j) for each of a plurality of queues, each queue of a particular traffic class, wherein the bandwidth limit value is represented by a number of tokens in a token bucket, and wherein limit values of each queue of each particular traffic class together define how the queue is serviced with available bandwidth for a bandwidth allocation period, the bandwidth allocation period comprising a plurality of bandwidth allocation cycles, the updating comprising performing for each queue:
   modifying, by the OLT, an initial value (Ni,j), indicative of tokens for previously assigned bandwidth, by:
   reducing the initial value by a value (EkMi,jk) indicative of tokens granted during a previous bandwidth allocation period, and
   adding a predetermined bandwidth value (nTi,j) representing a nominal bandwidth limit for the next bandwidth allocation period;
   setting the bandwidth limit value (Bmax,i,j) to the smaller of the modified initial value or a bucket limit value (Nmax,i,j) of the token bucket;

producing a bandwidth allocation map for the next bandwidth allocation period based on the updated bandwidth limit value for each queue; and transmitting the bandwidth allocation map to the ONUs and dividing the upstream bandwidth between the ONUs.

2. The method as claimed in claim 1, wherein reducing the initial value comprises reducing the initial value in proportion to granted bandwidth for the queue.

3. The method as claimed in claim 2, wherein the adding comprises adding tokens to the token bucket for the queue at a predetermined rate, up to the maximum value (Nmaxij) at which the token bucket is full, and if the maximum value of tokens is reached additional tokens are not added to the bucket but are discarded.

4. The method as claimed in claim 1, in which a predetermined bandwidth value for each bandwidth allocation cycle (Tij) is included in descriptor information for a particular type of traffic queue.

5. The method as claimed in claim 1, in which a same predetermined bandwidth value for each bandwidth allocation cycle (Tij) is used over the bandwidth allocation period comprising a plurality of bandwidth allocation cycles (n).

6. A communications network node comprising a processor and a memory storing machine-readable instructions for determining bandwidth allocation for at least two other communications network nodes by dividing upstream bandwidth between the other communications network nodes, wherein on execution of the instructions by the processor, the processor is configured to:
update a bandwidth limit value (Bmax,i,j) for each of a plurality of queues, each queue of a particular traffic class, wherein the bandwidth limit value is represented by a number of tokens in a token bucket, and wherein limit values of each queue of each particular traffic class together define how the queue is serviced with available bandwidth for a bandwidth allocation period, the bandwidth allocation period comprising a plurality of bandwidth allocation cycles, the updating comprising performing for each queue:
modifying an initial value (Ni,j), indicative of tokens representing previously assigned bandwidth, by:
reducing the initial value by a value (EkMi,jk) indicative of tokens granted during a previous bandwidth allocation period, and
adding a predetermined bandwidth value (nTi,j) representing a nominal bandwidth limit for the next bandwidth allocation period;
setting the bandwidth limit value (Bmax,i,j) to the smaller of the modified initial value or a bucket limit value (Nmax,i,j) of the token bucket;
the processor further configured to produce a bandwidth allocation map for the next bandwidth allocation period based on the updated bandwidth limit value for each queue; and
further comprising a transmitter configured to transmit the bandwidth allocation map to the other communication network nodes dividing the upstream bandwidth between the other communication network nodes.

7. A bandwidth allocation apparatus for a communications network node comprising a processor and a memory storing machine-readable instructions for determining bandwidth allocation for at least two other communications network nodes by dividing upstream bandwidth between the network nodes, wherein on execution of the instructions by the processor, the processor is configured to:
update a bandwidth limit value (Bmax,i,j) for each of a plurality of queues, each queue of a particular traffic class, wherein the bandwidth limit value is represented by a number of tokens in a token bucket, and wherein limit values of each queue of each particular traffic class together define how the queue is serviced with available bandwidth for a bandwidth allocation period, the bandwidth allocation period comprising a plurality of bandwidth allocation cycles, the updating comprising performing for each queue:
modifying an initial value (Ni,j), indicative of tokens representing previously assigned bandwidth, by:
reducing the initial value by a value (EkMi,jk) indicative of tokens granted during a previous bandwidth allocation period, and
adding a predetermined bandwidth value (nTi,j) representing a nominal bandwidth limit for the next bandwidth allocation period;
setting the bandwidth limit value (Bmax,i,j) to the smaller of the modified initial value or a bucket limit value (Nmax,i,j) of the token bucket;
the processor further configured to produce a bandwidth allocation map for the next bandwidth allocation period based on the updated bandwidth limit value for each queue; and
a transmitter configured to transmit the bandwidth allocation map to the network nodes dividing the upstream bandwidth between the network nodes.

8. A non-transitory computer readable medium for dynamic uplink bandwidth allocation by dividing upstream bandwidth between network nodes, comprising machine-readable instructions which, when executed by a processor in a bandwidth allocation apparatus, cause the processor to:
update a bandwidth limit value (Bmax,i,j) for each of a plurality of queues, each queue of a particular traffic class, wherein the bandwidth limit value is represented by a number of tokens in a token bucket, and wherein limit values of each queue of each particular traffic class together define how the queue is serviced with available bandwidth for a bandwidth allocation period, the bandwidth allocation period comprising a plurality of bandwidth allocation cycles, the updating comprises performing for each queue:
modifying an initial value (Ni,j), indicative of tokens for previously assigned bandwidth, by:
reducing the initial value by a value (EkMi,jk) indicative of tokens granted during a previous bandwidth allocation period, and
adding a predetermined bandwidth value (nTi,j) representing a nominal bandwidth limit for the next bandwidth allocation period;
setting the bandwidth limit value (Bmax,i,j) to the smaller of the modified initial value or a bucket limit value (Nmax,i,j) of the token bucket;
the processor further configured to produce a bandwidth allocation map for the next bandwidth allocation period based on the updated bandwidth limit value for each queue; and
the processor further configured to transmit the bandwidth allocation map to the network nodes dividing the upstream bandwidth between the network nodes.

* * * * *